3,523,810
NONGELLING TITANIA PIGMENTS
Thomas F. Swank, Woburn, Mass., assignor to Cabot Corporation, Boston, Mass., a corporation of Delaware
No Drawing. Filed Dec. 20, 1966, Ser. No. 603,142
Int. Cl. C09c 1/36, 3/02
U.S. Cl. 106—300                                    7 Claims

ABSTRACT OF THE DISCLOSURE

Titanium dioxide treated with a particular crystalline form of alumina which is useful as a pigment in the formulation of gel-resistant latex paints and a process for preparing said pigments.

---

This invention relates generally to the production of titanium dioxide and especially to improved titanium dioxide pigments which contribute excellent viscosity stability to latex paint compositions. The invention further relates to a novel process for preparing these improved pigments.

Interest in manufacture of pigment grade titanium dioxide has increased greatly in recent years, in large part because of the advent of pyrogenic processes such as vapor phase oxidation or hydrolysis of titanium tetrachloride at elevated temperatures. Titanium dioxide, as initially produced, lacks optimum properties; for example, its resistance to degradation by ultraviolet light usually requires improvement. Consequently, various aftertreatment processes have been developed for upgrading the properties of titanium dioxide to provide better dispersibility, chalking resistance, weather resistance, resistance to yellowing, etc. Generally, said aftertreatment processes deposit a coating of oxides or hydrates of alumina, titania, or silica, alone or in various combinations, onto the surface of the titanium dioxide.

However, one problem encountered by manufacturers of titanium dioxide is the fact that latex paints containing such alumina-aftertreated titanium dioxide generally exhibit a substantial increase in viscosity on aging.

Accordingly, a considerable amount of work has been carried out by those skilled in the art to avoid these problems. For example a process described in a commonly-owned and copending application Ser. No. 560,801 filed June 27, 1966, by Thomas L. O'Connor and J. Paul Bourgault, describes a method whereby a further silica aftertreatment is used in conjunction with an alumina aftertreatment to give a titania pigment useful in formulation of gel-resistant latex paints. Such a process is effective but requires an additional chemical processing step following the aftertreatment with alumina.

It is a principal object of the present invention to produce an improved titanium dioxide pigment which can be dispersed in latex paints without causing paint-gelling problems.

It is a further object of the invention to provide an improved process for making an alumina-treated titania for use in such improved pigments.

Other objects and advantages of the present invention will in part be obvious and will in part appear hereinafter.

In accordance with the process of the present invention, a substantially stable latex paint can be produced by modifying the surface of the titanium dioxide pigment to be utilized therein with a coating of particular alumina crystal form which form can be added to titania pigment only by careful control of process conditions. The crystalline form is boehmite having an average crystallite size of at least about 50 angstroms.

It is believed that such a crystalline alumina deposited on the surface of titanium dioxide avoids any substantial increase in the viscosity of paint compositions, in which the dioxide is incorporated, because it avoids any subsequent major change in alumina crystal morphology during storage of the paint compositions. It is believed that during such changes in morphology, the long range order of alumina will increase and link titania pigment particles together despite aftertreatment. Such linking causes gelling of latex paint systems.

In accordance with the present invention, the term latex paint, refers generally to any emulsion paint composition comprising an emulsion of a binder in water, the binder being small globules or particles of natural or synthetic rubber or other polymeric substance. Specific examples of such polymeric substance are styrene-butadiene polymers, polyvinyl-acetate polymers and copolymers, the various polyacrylate polymers and copolymers, and the like.

The process by which titanium dioxide starting material is produced is not critical. Either the product of the sulfate process or product of the chloride process is suitable although the process is of particular advantage when utilized with the latter. However, the titanium dioxide starting material utilized in accordance with this invention should have an average particle diameter of between about 150 and about 400 millimicrons. Advantageously, a pyrogenic titanium dioxide having an average particle diameter of between about 180 and 300 millimicrons is utilized.

The amount of crystalline alumina precipitated onto the surface of the pyrogenic pigment is subject to considerable variation. In general, however, a coating of from about 0.5% to about 10.0% of alumina per weight of titanium dioxide is appropriate for practice of the instant invention. Preferred coatings range from 1.5 to 6%.

The process of the invention may be achieved by either of two routes: one utilizing such base-yielding aluminum salts as sodium aluminate and the like, the other utilizing acid-yielding salts such as aluminum sulfate and the like.

In the process using a base-yielding aluminum salt such as sodium aluminate, calcium aluminate, and the like, the precipitated alumina will be sufficiently well crystallized if the precipitation is carried out at between about 20° C. and about 100° C. with neutralizing quantities of an acid such as acetic acid, hydrochloric acid, nitric acid, sulfuric acid and the like.

The addition of alumina to titanium dioxide by use of sodium aluminate or like-base-yielding salts is known to the art. However, the prior art, specifically that in such patents as U.S. Pat. 3,220,867 to O'Shaughnessy and U.S. Pat. 3,086,877 to Sheehan et al., suggests the addition of sodium aluminate to an acidic slurry. Such an addition yields an unduly large amount of a relatively amorphous alumina having a relatively small crystallite size. It has now been discovered that when the base-yielding aluminum salt is added to a basic slurry of $TiO_2$ for example a slurry from 7 to 10 (preferably 8 to 10) in pH and then after precipitating alumina by means of a neutralization step, subjecting the slurry to a relatively mild thermal aftertreatment. This aftertreatment can be carried out at a pH from 7 to 10 at temperatures of from 40° C. or higher for at least 5 minutes. In practice the higher the temperature, the shorter the postreatment and the lower the pH required to obtain a desirable boehmite crystalline structure. For this purpose, the boehmite structure of the alumina added by postreatment, should be comprised of crystallites having an average diameter of at least 50 angstroms as measured by utilization of X-ray diffraction techniques as interpreted by the Scherrer relationship.

$$T = \frac{0.9l}{B \cos x}$$

and where:

T=crystallite size
l=wavelength of X-rays in angstrom units
x=spectrometer angle at which the peak occurs The crystallite sizes disclosed in the working examples herein were obtained by averaging four different values to T. These values were those calculated with angles corresponding to the four major peaks which characterize the boehmite on an X-ray diffraction pattern.

Another process by which the novel product of the invention may be produced is that whereby alumina is precipitated by neutralization of an acid solution for example $Al_2(SO_4)_3$ solution or an $AlCl_3$ solution. This precipitation is conveniently carried out with those organic or inorganic bases such as sodium carbonate or ammonia, and the like which will not yield any undesirable precipitate during the course of the neutralizinfi procedure.

In the process utilizing the neutralization of acid solutions, it is advantageous to age the alumina-coated pigment for from about 1 to 24 hours at 70° C. to 100° C. However, a substantially crystalline alumina may be obtained by curing the slurry for about an hour at 95° C. As is indicated above, higher temperatures or higher pH tend to reduce the cure time required to get a 50 angstrom crystallite. The crystallization can be accelerated by higher pH and higher temperatures. This aging will cause the alumina to optimize its crystalline structure sufficiently so that any subsequent crystallization in a latex paint composition will be of a non-troublesome magnitude.

It should be noted that it is well known and often extremely advantageous to add a silicate compound of the type well known in the art to a silica content on the titanium dioxide of between about 0.05 to 0.4% to a titanium dioxide slurry as a dispersing aid prior to any aftertreatment process. The use of silica in that way is unrelated to, and can be complementary to the present invention wherein a crystalline alumina is coated onto titanium dioxide.

A further embodiment of the present invention is applying an initial coating to the titanium dioxide starting material of a hydrate or oxide of titania prior to, simultaneously with, or after the application of the coating of crystalline alumina. Any soluble titanium compound such as titanium tetrachloride, titanium sulfate, tetraethyl titanate and the like can be utilized for the purpose of applying the titania coating. However, titanium tetrachloride is preferred. The amount of hydrate or oxide of titania precipitated onto the titanium dioxide surface should be small because it tends to interfere with the crystallizing of the alumina deposited according to the process of the invention. In general, a coating of between about 0.5 and about 2.5% of titania per weight of the titanium dioxide starting material is entirely suitable.

In the working examples are described a number of aftertreatment processes including a control wherein titania is treated with amorphous titania and several illustrations of the new process. The pigments formed are each tested for viscosity stability at 60° C. in a formulation comprising the following ingredients:

| | Grams |
|---|---|
| Masterbatch | 20.0 |
| Igepal CO–630 | 0.6 |
| Pigment | 35.0 |
| Water | 11.5 |

The masterbatch comprises:

| Material: | Wt. percent |
|---|---|
| $H_2O$ | 92.61 |
| Cellosize | 1.67 |
| Tamol 731 | 2.86 |
| KTPP | 1.43 |
| Polyglycol P1200 | 1.43 |

Cellosize is a trade name designating a hydroxyethyl cellulose sold by Union Carbide Corporation.

Tamol 731 is a trade name designating a dispersant sold by Rohm and Haas Co.

Igepal CO–630 is a trade name designating a nonionic surface active agent sold by General Aniline and Film Corporation.

KTPP is used above to designate potassium tripolyphosphate.

Polyglycol P–1200 is a trade name designating an antiform agent sold by Dow Chemical Company.

The formulation essentially comprises all of the ingredients of a conventional latex paint except the polymer binder. It is prepared by dispersion on a Cowles mixer in a 100 ml. beaker for 15 minutes and pH adjustment to 9.2 with $NH_3$. The resultant dispersion is tested in an oven at 60° C.

EXAMPLE 1

Into a one-gallon ball mill were charged 430 grams of water, 20.16 mls. of sodium silicate, and 1000 grams of a titanium dioxide base pigment. The mill was agitated for two hours at 50 r.p.m. with a ball charge of 4.1 lbs. of ¾-inch porcelain balls.

At the end of the two-hour period the ball-milled slurry was discharged and the mill was twice washed with 890 grams of water each time. The wash water was added to the slurry. The pH of the resultant mixture was 10.1.

A quantity of 738 mls. of a 32.7% $Al_2(SO_4)_3 \cdot 18H_2O$ solution was added to the slurry bringing the pH to about 3.35. The slurry was then rapidly neutralized (over about three to four minutes) with 1220 ml. of 13% sodium carbonate. The resultant pH of the slurry was 7.02. The resultant slurry was filtered immediately on a Buchner filter and washed with about 8 liters of water.

The alumina on the titanium dioxide was amorphous; the crystallite size of the alumina was such that the average crystallite diameter was less than 20 angstroms.

EXAMPLE 2

Charged into a ball mill and agitated for 2 hours as described in Example 1 were 430 grams of water, 20.16 mls. of a sodium silicate solution of 0.1 gram sodium silicate per ml., and 1000 grams of a titanium dioxide pigment. The ball-milled slurry, together with the ball-mill wash water as described in Example 1, was heated to 70° C. The pH was determined to be 9.00.

250.5 grams of concentrated $Na_2Al_2O_4$ solution (28.5 grams $Al_2O_3$ per 100 mls. of solution) bringing the pH to about 10.9. Neutralization was carried out by reducing the pH to 6.97 with HCl over a 25-minute period. The pH was then raised to 9.0 with 13% $Na_2CO_3$. After further heating for 30 minutes at 70° C., the slurry was filtered and the resultant filter cake was washed with 8 liters of water. Washtime was about the same, no faster, than that required in Example 1.

The alumina on the titanium dioxide was highly crystalline in the boehmite form. Average diameter of the boehmite crystallite was 79 angstroms.

EXAMPLE 3

This treatment is designed to impart a coprecipitated after treatment on titania, the aftertreatment comprising 5.0% $Al_2O_3$ and 0.2% $SiO_2$.

A one-gallon ball mill is charged with 410 grams water, 20.2 mls. of a sodium silicate solution (comprising 0.0992 equivalent gram of $SiO_2$ in each ml. of the *sodium silicate solution*), and 1000 grams of titanium dioxide. After ball-milling for two hours, the slurry is removed and the ball mill is washed with two 890 ml. portions of water which are added to the slurry. The slurry is then heated to 70° C., while being continuously agitated. The pH of the slurry is 9.10.

To this slurry are added 747.4 mls. of an aluminum sulfate solution containing the equivalent of 0.0663 *gram* of $Al_2O_3$ per ml. of solution. The pH is reduced to 2.57 by this addition. Next, 1200 mls. of a 13% $Na_2CO_3$ solution is added raising the pH to 8.18. After curing for 2 hours at 90° C., the material is washed.

The cake is dried in an oven for about 14 hours at 110° C.

The alumina deposited on the surface of the cake is boehmite but somewhat less crystalline than the alumina deposited in Example 2. Average crystallite diameter of the boehmite was about 65 angstroms.

EXAMPLE 4

A slurry comprising 430 grams of water and 1000 grams of $TiO_2$ is ball milled, augmented with ball mill wash water and heated to 70° C. as for the preceding examples.

The pH of the slurry is 5.88.

747.5 mls. of an aluminum sulfate solution (containing the equivalent of 0.066 grams per ml. of *solution*) are added to the slurry and the pH drops to about 2.5. After neutralizing to pH 8.13 with 1180 ml. of 13% $Na_2CO_3$, the slurry is heated to 80° C. for 60 minutes.

Average diameter of the boehmite crystalite was 54 angstroms.

The preceding examples are set forth as illustrative of the process of the invention and the products produced thereby. Those skilled in the art will realize that various modifications in process conditions and manipulative techniques can be used when practicing the invention.

The titania of Example 1, i.e., the control titania, gelled substantially within two days.

The titania of Example 2, i.e., the titania treated by precipitating the alumina by *acidification* of a *basic* solution was substantially free of any troublesome gel for five weeks at which time observation of the system was discontinued.

The titania of Examples 2 and 3 each showed a very little gel formation after standing for a few days, however, this gel disappeared on very mild agitation and did not again appear during the test period.

What is claimed is:

1. A titanium dioxide-based pigment suitable for use in nongelling latex paint compositions comprising a rutile titanium dioxide substrate coated with a boehmite-type alumina having an average crystallite size of at least about 50 angstroms said alumina being present in amounts of from about 0.5 to about 10% by weight based on the titanium dioxide.

2. A pigment as defined in claim 1 wherein said titanium dioxide substrate consists of a pyrogenic titanium dioxide having an average particle diameter of between about 150 and 400 millimicrons.

3. A titanium dioxide-based pigment as defined in claim 1 wherein said boehmite-type alumina is present in amounts of from about 1.5 to about 6% by weight based on the titanium dioxide.

4. A process for preparing pigmentary titanium dioxide coated with a boehmite-type alumina having an average crystallite size of at least about 50 angstroms which comprises forming an aqueous slurry of titanium dioxide at a pH of from 7 to 10, adding a base-yielding aluminum salt to said slurry, neutralizing said slurry thereby precipitating alumina on said titanium dioxide and curing said pigment in the aqueous slurry at a pH of 7 or above for at least five minutes and until said crystallite size of the alumina averages 50 angstroms.

5. A process as defined in claim 4 wherein said base-yielding aluminum salt is sodium aluminate.

6. A process for preparing pigmentary titanium dioxide coated with a boehmite-type alumina having an average crystallite size of at least about 50 angstroms which comprises forming an aqueous slurry of titanium dioxide at a pH of from 7.0 to 10.0, adding an acid-yielding aluminum salt to said slurry, neutralizing said slurry thereby precipitating alumina on said titanium dioxide and curing said pigment in the aqueous slurry for a period of from about 1 to about 24 hours at a temperature of from about 70 to about 100° C. until said crystallite size of the alumina averages 50 angstroms.

7. The process of claim 6 wherein said acid-yielding aluminum salt is aluminum sulfate or aluminum chloride.

References Cited

UNITED STATES PATENTS

| 2,284,772 | 6/1942 | Seidel | 106—300 |
|---|---|---|---|
| 2,671,031 | 3/1954 | Whately | 106—300 |
| 3,035,966 | 5/1962 | Siuta. | |
| 3,203,818 | 8/1965 | Rechmann et al. | 106—300 |
| 3,212,911 | 10/1965 | Berstein | 106—300 |
| 3,251,705 | 5/1966 | Rieck et al. | 106—300 |
| 3,383,231 | 5/1968 | Allan | 106—300 |
| 3,409,454 | 11/1968 | Andrew et al. | |
| 3,409,501 | 11/1968 | Siuta. | |

TOBIAS E. LEVOW, Primary Examiner

H. M. SNEED, Assistant Examiner

U.S. Cl. X.R.

106—308; 260—29.6